(12) United States Patent
Clifford

(10) Patent No.: US 8,977,849 B1
(45) Date of Patent: Mar. 10, 2015

(54) SYSTEMS AND METHODS FOR CREATING A RIGHTS MANAGEMENT SYSTEM (RMS) WITH SUPERIOR LAYERS AND SUBORDINATE LAYERS

(75) Inventor: Thomas Clifford, Edina, MN (US)

(73) Assignee: Symantec Corporation, Mountain View, CA (US)

( * ) Notice: Subject to any disclaimer, the term of this patent is extended or adjusted under 35 U.S.C. 154(b) by 458 days.

(21) Appl. No.: 12/552,404

(22) Filed: Sep. 2, 2009

(51) Int. Cl.
G06F 21/62 (2013.01)

(52) U.S. Cl.
USPC .................. 713/167; 726/5; 726/29; 713/166

(58) Field of Classification Search
CPC ...................... H04L 2209/60; H04L 2209/603
USPC .......... 713/167, 200, 166; 726/5–10; 709/205
See application file for complete search history.

(56) References Cited

U.S. PATENT DOCUMENTS

| | | | | |
|---|---|---|---|---|
| 5,629,980 A | * | 5/1997 | Stefik et al. | 705/54 |
| 5,903,650 A | * | 5/1999 | Ross et al. | 705/59 |
| 6,023,766 A | * | 2/2000 | Yamamura | 726/29 |
| 6,189,146 B1 | * | 2/2001 | Misra et al. | 717/177 |
| 6,981,262 B1 | * | 12/2005 | DeMello et al. | 719/310 |
| 7,017,189 B1 | * | 3/2006 | DeMello et al. | 726/26 |
| 7,188,342 B2 | * | 3/2007 | DeMello et al. | 717/173 |
| 7,430,542 B2 | * | 9/2008 | DeMello et al. | 380/279 |
| 7,552,468 B2 | * | 6/2009 | Burch et al. | 726/5 |
| 7,698,223 B2 | * | 4/2010 | Padawer et al. | 705/51 |
| 2002/0156850 A1 | * | 10/2002 | Hamscher et al. | 709/205 |
| 2002/0157091 A1 | * | 10/2002 | DeMello et al. | 717/178 |
| 2009/0199287 A1 | * | 8/2009 | Vantalon et al. | 726/9 |
| 2010/0037051 A1 | * | 2/2010 | Chang et al. | 713/167 |
| 2010/0161889 A1 | * | 6/2010 | Dunstan | 711/103 |

* cited by examiner

Primary Examiner — Jung Kim
Assistant Examiner — Thomas Ho
(74) Attorney, Agent, or Firm — Holland & Hart, LLP

(57) ABSTRACT

A computer-implemented method for creating a rights management system (RMS) with superior layers and subordinate layers is described. A separate trust network for one or more layers of the RMS is established. The trust network includes one or more computing nodes within the one or more layers. A data object is created on a computing node that is a member of trust network in a superior layer. The data object is encrypted to a ciphertext data object. A publishing license is created for each of the one or more layers of the RMS. Access rights and attributes associated with the ciphertext data object are controlled within each layer based on the publishing license of each of the one or more layers of the RMS.

16 Claims, 7 Drawing Sheets

SYSTEMS AND METHODS FOR CREATING A RIGHTS MANAGEMENT SYSTEM (RMS) WITH SUPERIOR LAYERS AND SUBORDINATE LAYERS

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet. Many businesses use one or more computer networks to communicate and share data between the various computers connected to the networks. The productivity and efficiency of employees often requires human and computer interaction.

Computer technologies used by consumers and by the business world continue to demand that the efficiency of these technologies increase. These demands have included demands to improve security related to sensitive information that may be shared between users of computers. For example, a user may desire to protect certain content that is shared with other users such that the content is not altered, deleted, shared with unauthorized users, etc.

Rights Management Services (or Systems) (RMS) is a technology that provides selective functionality denial that may be used for limiting the uses of certain content that may be shared between users. The content may be encrypted such that only authorized users may decrypt the content. In addition, specific operations including printing, copying, editing, forwarding, and deleting may be allowed or disallowed by owners of the encrypted content.

Users of RMS may desire the services to efficient and customizable for each piece of protected content. As a result, benefits may be realized by providing systems and methods for creating an RMS that includes superior layers and subordinate layers in order to efficiently manage and control access rights to content protected by the RMS.

SUMMARY

According to at least one embodiment, a computer-implemented method for creating a rights management system (RMS) with superior layers and subordinate layers is described. A separate trust network for one or more layers of the RMS is established. The trust network includes one or more computing nodes within the one or more layers. A data object is created on a computing node that is a member of trust network in a superior layer. The data object is encrypted to a ciphertext data object. A publishing license is created for each of the one or more layers of the RMS. Access rights and attributes associated with the ciphertext data object are controlled within each layer based on the publishing license of each of the one or more layers of the RMS.

In one embodiment, a superior layer may be an enterprise rights management (ERM) layer to manage access rights associated with the ciphertext data object. A layer subordinate to the superior layer may be an object storage rights management (OSRM) layer to manage storage attributes of the ciphertext data object.

In one configuration, a contract between a superior layer and a subordinate layer is established. The contract may prevent a computing node within the subordinate layer from modifying the publishing license in the subordinate layer prior to approval from a computing node within the superior layer. In another embodiment, the contract may allow a computing node within the subordinate layer to modify the publishing license in the subordinate layer prior to receiving approval from a computing node within the superior layer. In another configuration, the computing node in the subordinate layer may notify the computing node in the superior layer subsequent to the modification of the publishing license in the subordinate layer. In addition, the contract may allow a computing node within the subordinate layer to modify the publishing license in the subordinate layer without prior or subsequent notification to a computing node in the superior layer. Further, the contract may allow a computing node within the subordinate layer to delegate the enforcement of the publishing license in the subordinate layer that is associated with the ciphertext data object to a computing node within a second subordinate layer.

A computer system within a superior layer of a rights management system (RMS) configured to manage rights and attributes associated with a data object is also described. The computer system may include a processor and memory in electronic communication with the processor. The computer system may also include a trust system configured to establish a separate trust network for the superior layer of the RMS, wherein the trust network comprises one or more computing nodes within the layer. The system may also include an encryption module configured to encrypt a data object to a ciphertext data object. The computer system may further include a publishing license enforcement module configured to create a publishing license for the superior layer of the RMS, and control rights and attributes associated with the ciphertext data object within the superior layer.

A computer-program product for creating a rights management system (RMS) with superior layers and subordinate layers is also described. The computer-program product may include a computer-readable medium having instructions thereon. The instructions may include code programmed to establish a separate trust network for one or more layers of the RMS. The trust network may include one or more computing nodes within the one or more layers. The instructions may also include code programmed to create a data object on a computing node that is a member of a trust network in a superior layer. The instructions may also include code programmed to encrypt the data object to a ciphertext data object, and code programmed to create a publishing license for each of the one or more layers of the RMS. Further, the instructions may also include code programmed to control rights and attributes associated with the ciphertext data object within each layer based on the publishing license of each of the one or more layers of the RMS.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
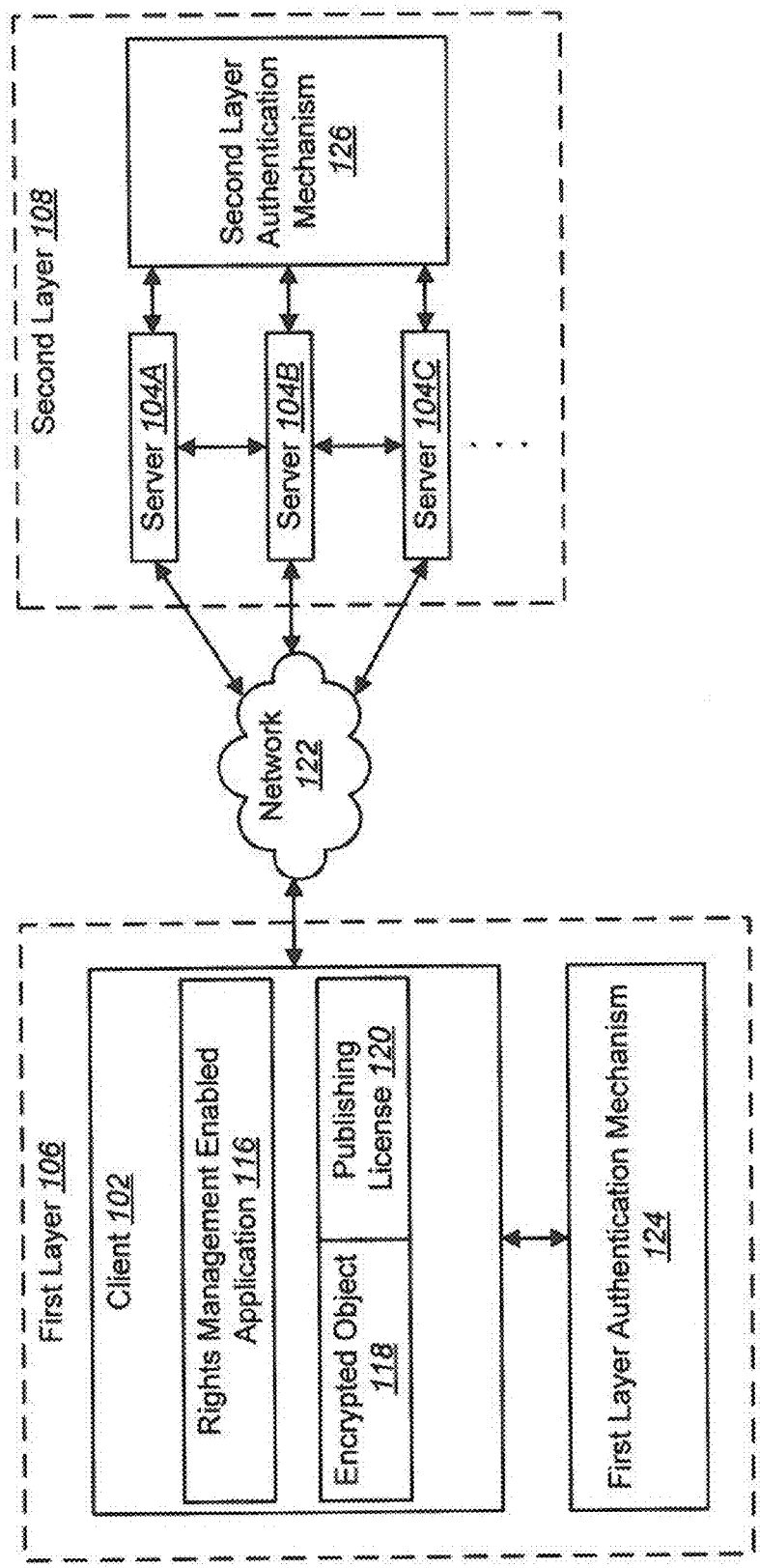
FIG. 1 is a block diagram illustrating one embodiment of a client communicating with a server across a network connection.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Rights Management Services (or Systems) (RMS) is a technology that provides selective functionality denial that may be used for limiting the uses of certain documents. Examples of these documents may include e-mails, Word documents, web pages, etc. In one embodiment, RMS technology may be used to protect the content within these documents by encrypting the information stored in these documents. Server based policies may prevent this protected content from being decrypted except by specified people or groups, in certain environments, under certain conditions, and for certain periods of time. In addition, specific operations including printing, copying, editing, forwarding, and deleting may be allowed or disallowed by authors (or owners) of the protected content. In one embodiment, enterprises may use a form of RMS technology. For example, an enterprise might employ the services of an Enterprise Rights Management (ERM) system.

In one configuration, ERM systems may be coupled with data creation applications. In addition, ERM systems may be coupled with principal authentication and authorization systems. Typical ERM systems may work well if the data creator, the recipient of the data, and the data creation application(s) exist within the same authentication domain. Current ERM systems, however, may begin to break down when the recipient of an ERM managed document belongs to a different authentication domain than the data creator (e.g., sending a Word document to someone at another company). Current ERM systems may also suffer drawbacks if the recipient of the ERM managed document is temporarily disconnected from the authentication domain (e.g., working offline). Some ERM systems may exist which proxy or handle offline authentication requests.

As the trend of linking management metadata to data continues, attributes, rules, and rights beyond ERM's principal authentication, authorization, and access rights, may be added to publishing licenses (PLs). Placing all of these attributes into a single PL, however, may become problematic in the following ways. First, all software and computers participating in the RMS must be part of the whole authentication domain. Second, software and computers managing less important rights of a protected document may, by default, have access to all of the rights associated with the document. Third, certain aspects of the RMS may not be separated or delegated.

In one configuration, ERM systems may use ERM aware applications (EAAs) to create and access data. After data is created, yet prior to saving the data, the EAA may record rights and access rules for the newly created data. With the help of the RMS, the EAA may create an immutable and confidential copy of the rights and access rights. This copy of the rights and access rules may be referred to as a PL.

In one example, an Extensible Rights Markup Language (XrML), or a similar method, may be used to describe the content of the PL. Information included in the PL may include principal identities which have been granted rights, rules describing the types of data access to be allowed, data signature, and the data encryption/decryption key. The PL, which may be encrypted by an RMS public key, may be attached to an encrypted copy of the data. The encrypted copy of the data may be referred to ciphertext data. In one embodiment, the ciphertext data (combined with the PL) may be written to disk.

At a later time, an EAA may be used to access the data. In one embodiment, the EAA may detect the existence of the PL and ciphertext data on the disk. In one example, the PL and the identity of the principal running the application may be sent to the RMS. In one embodiment, the RMS may examine the PL to determine if the previously established rules and rights should allow data access to the principal running the application. If access is granted, the RMS may create a user license (UL) and return the UL to the EAA. The EAA may then use the UL to decrypt the data. The EAA may also enforce the rights and access rules according to the contents of the UL.

In one embodiment, the present systems and methods may create an N layer RMS which may allow a layer (such as N, which may be orthogonal to other layers) to manage its assigned rights with only minimal interaction with a superior layer above the layer N (e.g., N−1). In one embodiment, the rules and rights available to layer N on a particular object may be established by a contract when the PL for layer N is created.

FIG. 1 is a block diagram illustrating one embodiment of a client 102 communicating with one or more servers 104A, 104B, 104C across a network 122 connection. In one configuration, the client 102 may be within a first layer 106 and the one or more servers 104A, 104B, 104C may be within a second layer 108. While only two layers 106, 108 are illustrated, it is to be understood that N layers may be used.

Each layer 106, 108 may include an authentication mechanism. For instance, the first layer 106 may include a first layer authentication mechanism 124 and the second layer 108 may include a second layer authentication mechanism 126. The authentication mechanism 124, 126 in each layer 106, 108 may be used to manage different attributes and rights associated with a data object 118. For example, the client 102 may include a rights management enabled application 116. In one embodiment, the application 116 may create an encrypted data object 118. Certain rights and attributes may be associated with the encrypted data object 118. These rights and attributes may be listed in a publishing license (PL) 120 that may be attached to the encrypted object 118. In one configuration, the rights may specify the access rights a particular user may have for the encrypted object 118. For example, a first user may have read/write access rights while a second user may have read-only access rights. The first layer may be an Enterprise Rights Management (ERM) layer and the authentication mechanism 124 may be used for managing these access rights to the encrypted data object 118. For example, the first layer authentication mechanism 124 may validate the first user and allow the first user read/write capabilities on the encrypted object 118. Similarly, the mechanism 124 may validate the second user and grant read-only access rights (i.e., denying the second user write capabilities) on the data object 118. In other words, the first layer mechanism 124 may prevent certain users certain access rights to protected content within an encrypted data object 118.

In one embodiment, the second layer authentication mechanism 126 may manage certain attributes associated with the encrypted object 118. For example, the second layer 108 may be an Object Storage Rights Management (OSRM) layer and the PL 120 attached to the encrypted data object 118 may describe attributes relating to the storage of the data object 118. These attributes may describe how many copies of the data object 118 should be maintained, the duration of time before the data object 118 can be deleted, etc. The servers 104A, 104B, 104C may form a trust network and the second layer authentication mechanism 126 may manage which servers may join this trust network. In this example, a potential server that desires to join the trust network would not be required to be authenticated by the first layer authentication mechanism 124.

The client 102 may transmit the encrypted data object 118 to one or more of the servers 104A, 104B, 104C for storage. While the object 118 is being stored, the second authentication mechanism 126 may verify that the attributes in the attached PL 120 are fulfilled. For example, if the attributes specify that the data object 118 should be stored in two separate locations, the second authentication mechanism 126 may verify that at least two servers are each storing a copy of the data object 118. In this example, the first layer authentication mechanism 124 is not responsible for verifying that the storage attributes associated with the object 118 are being properly carried out. In other words, each separate layer 106, 108 includes its own authentication mechanism for authenticating the various devices within the respective layer and for verifying that the rights and/or attributes associated with a data object are being executed properly.

Figure 2:
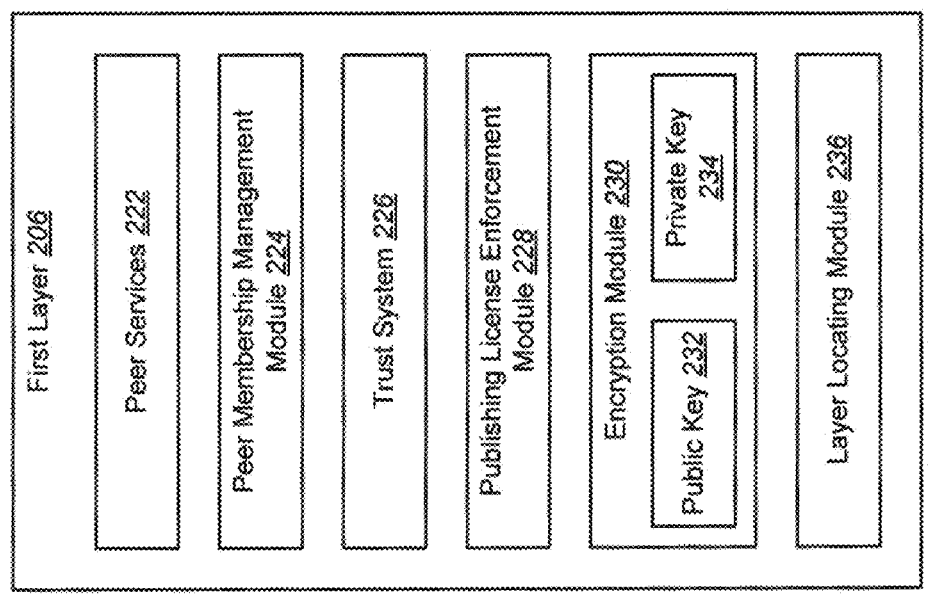
FIG. 2 is a block diagram illustrating one embodiment of a first layer associated with a Rights Management System (RMS)

FIG. 2 is a block diagram illustrating one embodiment of various modules and services that may be present within a first layer 206 associated with an ERM system. While FIG. 2 illustrates the first layer 206, the various modules and services described below may be implemented in the second layer 108 or any of the N layers of the present system and methods.

In one configuration, the first layer 206 may include a collection of peer services 222. In one example, the peer services 222 may manage the rights and rules for a particular layer (or domain). In addition, the first layer 206 may include a peer membership management module 224 to manage the membership of the first layer 206. In other words, the management module 224 may manage which peers within the first layer 206 may belong to a particular trust network. The first layer 206 may further include a trust system 226 that may include a security infrastructure to establish a trust relationship between the various peers in the layer and the collection of peer services 222. In one embodiment, the first layer 206 may also include a PL enforcement module 228. The module 228 may allow peers within the first layer 206 to interpret and enforce PLs attached to data objects within the first layer 206. In other words, the first layer 206 may not be required to interact with another layer in order to interpret and enforce the rights and/or attributes associated with a particular data object.

In a further embodiment, the first layer 206 may include an encryption module 230. The encryption module 230 may include a public key 232 and a private key 234. In one configuration, the encryption module 230 may use the keys 232, 234 to encrypt PLs within the first layer 206. The encryption module 230 may also encrypt PLs of a layer that is subordinate to (or below) the first layer 206. In other words, if the first layer 206 is layer N, the encryption module 230 may encrypt PLs that are within layer N, as well as PLs that are within layer N+1. The first layer 206 may further include a layer locating module 236. The locating module 236 may locate a layer that is superior to the first layer 206. In addition, the locating module 236 may locate a layer that is subordinate to the first layer 206. Location of the superior and subordinate layers may be accomplished through the established peer membership in each of these layers. For example, again assuming the first layer 208 is layer N, the layer locating module 236 may locate layer N−1 (superior layer) and layer N+1 (subordinate layer) through the peers located in each of the respective layers.

In one embodiment, the PLs within the first layer 206 (or any of the N layers of the present systems and methods) may be protected in various ways. For example, the PLs of the first layer 206 may be encrypted with a public key (C(N−1_pub)) associated with a layer that is superior to the first layer 206 (e.g., Layer N−1). In addition, PLs of the first layer 206 may be encrypted with a superior layer's private key (C(N−1_pvt)). Further, the PLs of the first layer 206 may be encrypted with the first layer's 206 public key 232 (C(N_pub)). In other words, if the first layer 206 is layer N, the PLs within layer N may be encrypted with layer N−1's public key, layer N−1's private key, or layer N's public key.

In one embodiment, contracts may exist between the various layers implemented by the present systems and methods. These interlayer contracts may include instructions from one layer to a subordinate layer regarding the manner to enforce, modify, and/or delegate the PLs in the subordinate layer that are attached to a data object that may be stored in the subordinate layer. For example, regarding the enforcement of the PLs within layer N, the data object may be created and encrypted by a peer within layer N. The enforcement of the layer N PL attached to this data object may be enforced within layer N. This enforcement may be accomplished by decrypting, reading, and interpreting layer N's public key (C(N_pub)) independently or by decrypting, reading, and interpreting layer N−1's private key (C(N−1_pvt)) with the cooperation of layer N−1.

As mentioned above, contracts between layers may exist that are directed to the modification PLs within a certain layer. For example, layer N may manage layer N+1. Data objects and PLs created and encrypted in layer N may be stored on peers within layer N+1. In one embodiment, layer N may require layer N+1 to gain immediate approval from layer N before modifications occur to the PLs of layer N. This may be accomplished by requiring the PLs stored within layer N+1 to be modified and re-encrypted by layer N. Completion of this modification and re-encryption may be verified by the private key (C(N_pvt)) of layer N.

In another embodiment, layer N may request a deferred notification from layer N+1 when the PLs are modified. This may be accomplished by requiring the PLs stored in layer N+1 to eventually be re-encrypted by layer N. This may be verified by the private key (C(N_pvt)) of layer N over an extended period of time. If verification is needed in the near-term, the verification may be accomplished by a layer modification and verification through the public key (C(N+1_pub)) of layer N+1.

In yet another example, layer N may allow layer N+1 to be self-managed with regards to the modification of the PLs within layer N+1. In other words, layer N may allow layer N+1 to modify PLs within layer N+1 without prior (i.e., immediate) or deferred approval from layer N. This may be accomplished by allowing layer N+1 to update its PLs by way of the public key (C(N+1_pub)) for layer N+1. Layer N+1 may verify it has been granted the right to modify its PLs by checking layer N's private key (C(N_pvt)) PL.

Interlayer contracts relating to the delegation of PL enforcement and modification may also exist. In one embodiment, delegation contracts may include the same contract types as the modification contract types, described previously. In other words, delegation contracts may include immediate approval, deferred notification, or self-managed contracts. Verification of the type of delegation contract currently implemented by a particular layer may be checked and verified by way of the layer's private key. For example, in order to verify the type of delegation contract implemented by layer N, the private key of layer N (C(N−1_pvt)) may be verified.

As previously described, the present systems and methods may separate out the management of rights and/or attributes associated with a data object into a hierarchy of rights layers. Depending on the rights a layer has been granted, the layer may manage the rights, delegate the rights to a subordinate layer, or delegate the delegation of rights to yet another subordinate layer. The contracts between the layers may be handled in an online, deferred, or offline/pre-delegated manner.

Figure 3:
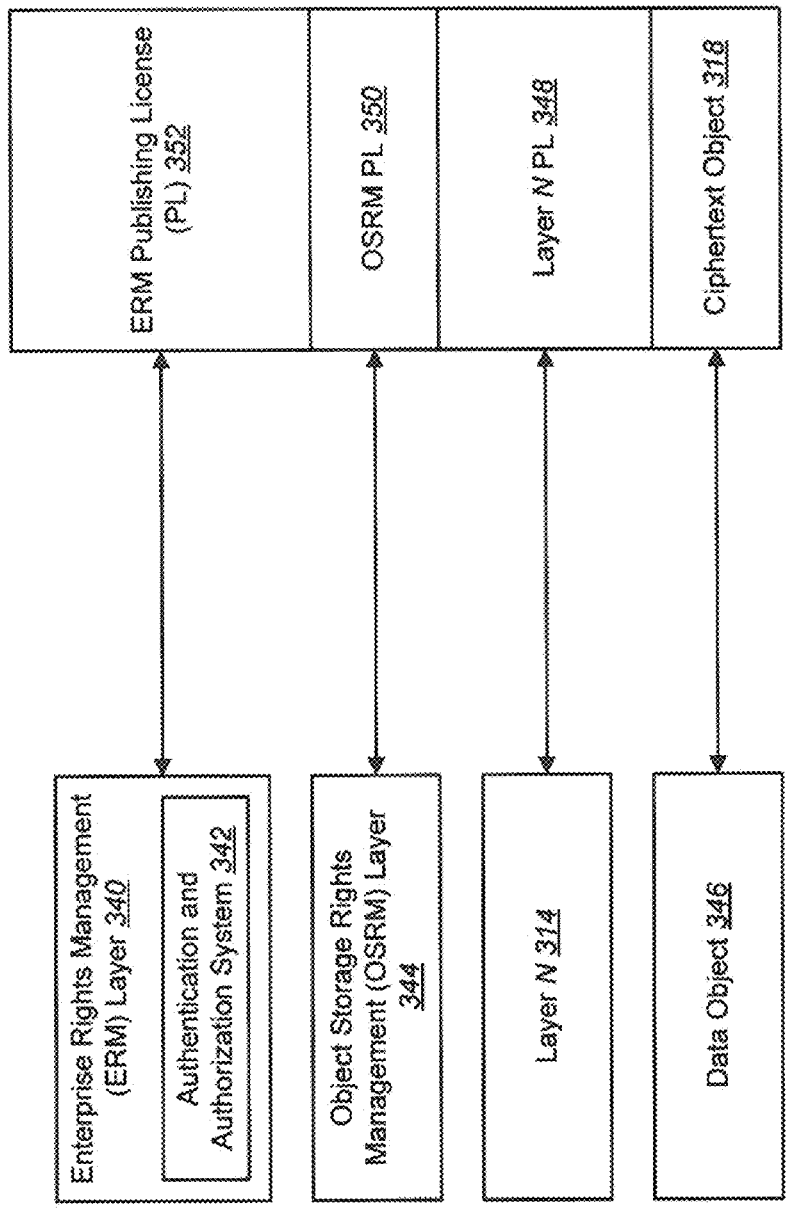
FIG. 3 is a block diagram illustrating one embodiment of specific layers that may be included within the RMS.

FIG. 3 is a block diagram illustrating one embodiment of specific layers that may be implemented by the present systems and methods. For example, an ERM layer 340 and an OSRM layer 344 are examples of two layers that may be implemented. Also illustrated is layer N 314 to indicate that the architecture of the present systems and methods may include up to N layers. Each of the layers, 340, 344, 314 may include the various modules, components, and systems previously described in relation to FIG. 2. For example, each layer 340, 344, 314 may include a public key infrastructure through the encryption module 230, as well as key management capability through the encryption module 230. Each of the layers, 340, 344, 314, may also include a trust system 226 as previously described. In addition, each layer may include an authentication mechanism to validate members of each respective layer as well as manage rights and/or attributes associated with a data object that may be located within one of these layers. An example of an authentication mechanism may include an authentication and authorization system 342 located in the ERM layer 340. While an authentication mechanism is not explicitly shown in each of the layers in FIG. 3, it is to be understood that each layer includes an authentication mechanism that is separate and distinct from mechanisms used in other layers, as shown in FIG. 1. Also illustrated in FIG. 3 is a data object 346 that may be encrypted into a ciphertext object 318.

In one embodiment, each layer 340, 344, 314 may be responsible for enforcing, modifying, and/or delegating rights and/or attributes listed in a PL that is attached to the ciphertext data object 318. In other words, the ERM layer 340 may be responsible for an ERM PL 352 that includes certain rights and/or attributes linked to the ciphertext object 318. Similarly, the OSRM layer 344 may be associated with an OSRM PL 350, and the layer N 314 may be associated with a layer N PL 348. As previously described, the PL for each layer may be a copy of the access rights and/or attributes associated with the ciphertext object 318.

Figure 4:
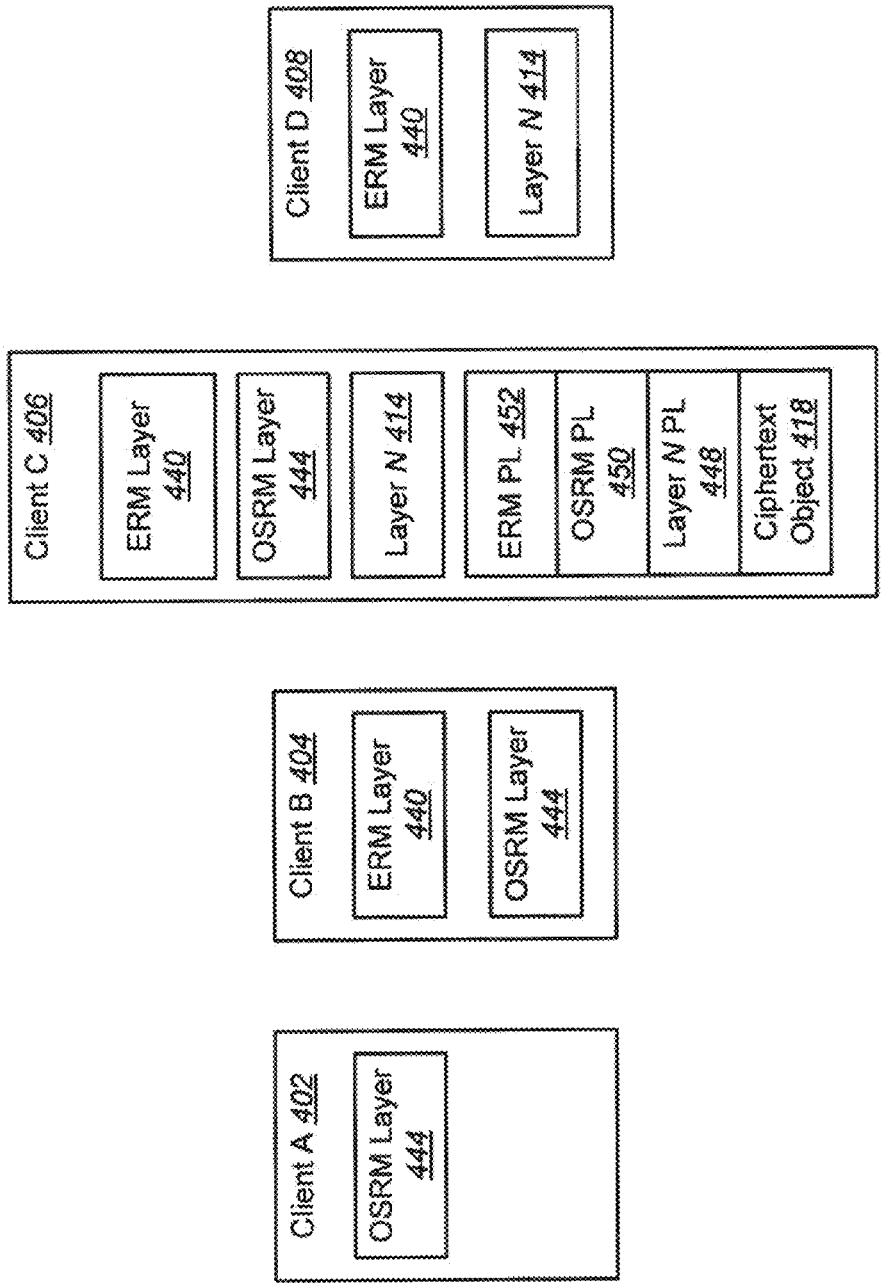
FIG. 4 is a block diagram illustrating various clients that may use or implement one or more layers of the RMS in order to manage the rights associated with a ciphertext object.

FIG. 4 is a block diagram illustrating various clients that may use one or more layers of the present systems and methods in order to manage the rights and/or attributes associated with a ciphertext object 418. As illustrated, client A 402 may implement an OSRM layer 444 to manage the storage and maintenance of the ciphertext object 418. In addition, client B 404 may implement an ERM layer 440, as well as an OSRM layer 444. Client D 408 may implement the ERM layer 440 and the a layer N 414.

In one embodiment, client C 406 illustrates a detailed implementation of various layers to manage the rights and/or attributes of a ciphertext object 418. In one embodiment, client C 406 may use the ERM layer 440, the OSRM layer 444, and the layer N 414. As a result, the PL attached to the ciphertext object 418 may be copied and included in each layer 440, 444, 414. In other words, client C 406 may include an ERM PL 452, an OSRM PL 450, and a layer N PL 448.

In one embodiment, the rights and/or attributes managed by layer N may be subordinate to the rights and/or attributes managed by the OSRM layer 444. Similarly, the rights and/or attributes managed by the OSRM layer 444 may be subordinate to the rights and/or attributes managed by the ERM layer 440. In this manner, an N layer rights management system with layered superior/subordinate rights and rules enforcement has been created to manage the rights and/or attributes associated with the ciphertext object 418. As previously explained, each of the layers may include additional peers (or computing devices) to manage these rights and/or attributes. Each layer includes its own authentication mechanism so that a subordinate layer may authenticate peers within its layer without the need to use an authentication mechanism within a superior layer.

Figure 5:
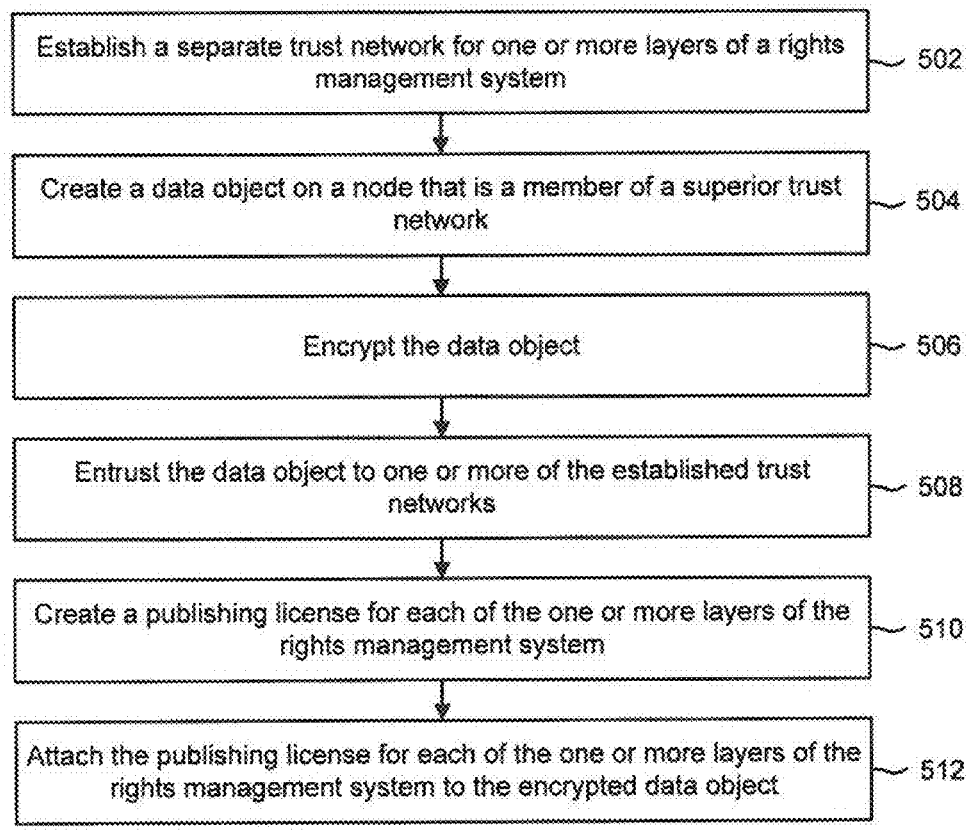
FIG. 5 is a flow diagram illustrating one embodiment of a method for creating a rights management system with N layers to manage the rights and access rules associated with a ciphertext data object.

FIG. 5 is a flow diagram illustrating one embodiment of a method 500 for creating a rights management system (RMS) with N layers to manage the access rights and/or attributes linked to an encrypted data object. In one embodiment, the method 500 may use an ERM layer to manage the access rights and an OSRM layer to manage other attributes of the data object. In one configuration, the superior rights may be maintained by the ERM layer.

In one embodiment, a separate trust network for each of the N layers of the RMS may be established 502. For example, a trust network may be established 502 between each of the clients, peers, device, etc. within a particular layer. Using the above example, a trust network between the peers in the ERM layer may be established and a separate trust network between the peers in the OSRM layer may be established. The trust network for the peers in the ERM layer may be considered a superior trust network because the ERM layer is superior to the OSRM layer. In one configuration, the established networks of different layers may overlap. In one words, some peers belonging to the ERM trust network may also belong to the OSRM trust network. In some embodiments, all of the peers (or nodes) in the various layers may not be a member of a trust network.

In one example, a data object may be created 504 on a node that is a member of a superior trust network. In one example, the data object may be created 504 on a node belonging to the ERM trust network. This node may also be a member of the OSRM trust network. In another embodiment, the node on which the data object is created 504 may only be a member of the ERM trust network and not a member of the OSRM trust network.

In one configuration, the data object may be encrypted 506 and rights and/or attributes may be assigned to the encrypted data object. These rights and/or attributes may indicate the rights certain individuals (or entities) have when accessing decrypting and accessing the data object. These assigned rights and/or attributes may be listed in a PL that is linked to the encrypted data object. Further, the encrypted data object may be entrusted 508 to one or more of the established trust networks for each layer. For example, the encrypted object may be entrusted to the OSRM layer which may manage the storage of the data object.

A copy of the PL may be created 510 for each of the one or more layers of the RMS. For example, an ERM layer PL and an OSRM layer PL may be created. Each layer may manage certain rights and/or attributes listed in the PL. In one embodiment, the data encryption key and the signature for the subordinate layer PL may be placed in the PL of the superior layer. For example, the data decryption key and the OSRM layer PL signature may be placed in the ERM layer PL. In one configuration, the PL for each of the one or more layers of the RMS may be attached 512 to the encrypted data object.

In one configuration, the ciphertext data object may move between nodes in a particular layer or between nodes of different layers. For example, while in storage in the OSRM layer, ciphertext data objects may be free to move between nodes that are within the trust network of the OSRM layer, including nodes which may not be members of the ERM trust network. In one embodiment, nodes within the OSRM layer may be enabled to decrypt the OSRM layer PL and enforce OSRM related contracts. In one embodiments, the nodes within the OSRM layer may enforce, manage, or delegate the OSRM layer PL depending on the interlayer contract that exists between the OSRM layer and the ERM layer. For example, the interlayer contract may indicate that the nodes within the OSRM layer may not modify the OSRM layer PL without the cooperation of a node belonging to the ERM trust network. As a result, the ciphertext data object may be brought back to an ERM node so that the OSRM layer PL signature in the ERM layer PL may be updated. In a further embodiment, the ERM trust network may reside in virtual computing nodes and the OSRM trust network may reside on physical computing nodes. In another embodiment, the ERM and OSRM trust networks may be combined in a cloud/grid environment where one group of computing nodes is responsible for application hosting and another group of computing nodes is responsible for data object management or storage.

Figure 6:
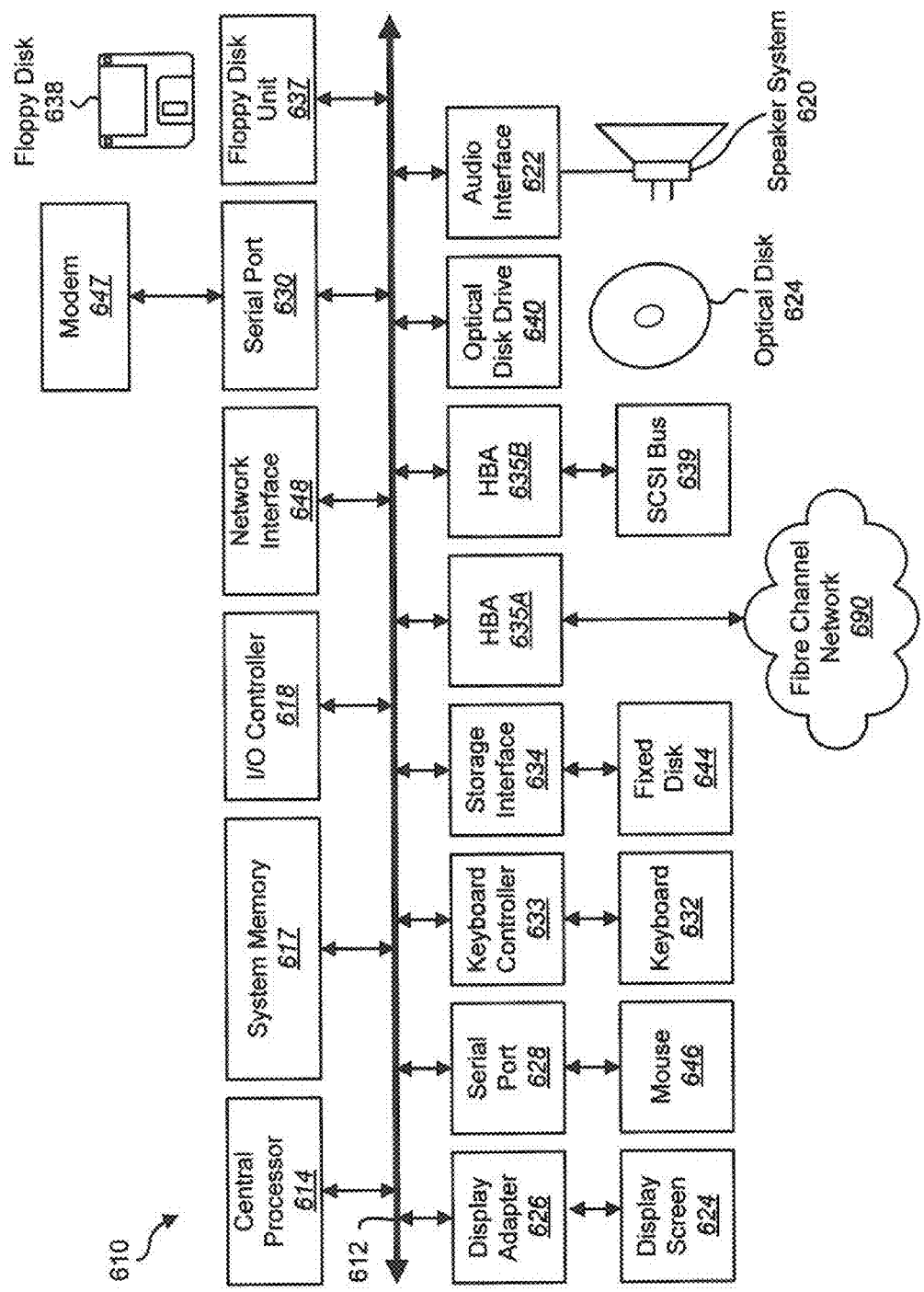
FIG. 6 depicts a block diagram of a computer system suitable for implementing the present systems and methods.

FIG. 6 depicts a block diagram of a computer system 610 suitable for implementing the present systems and methods. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present disclosure. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
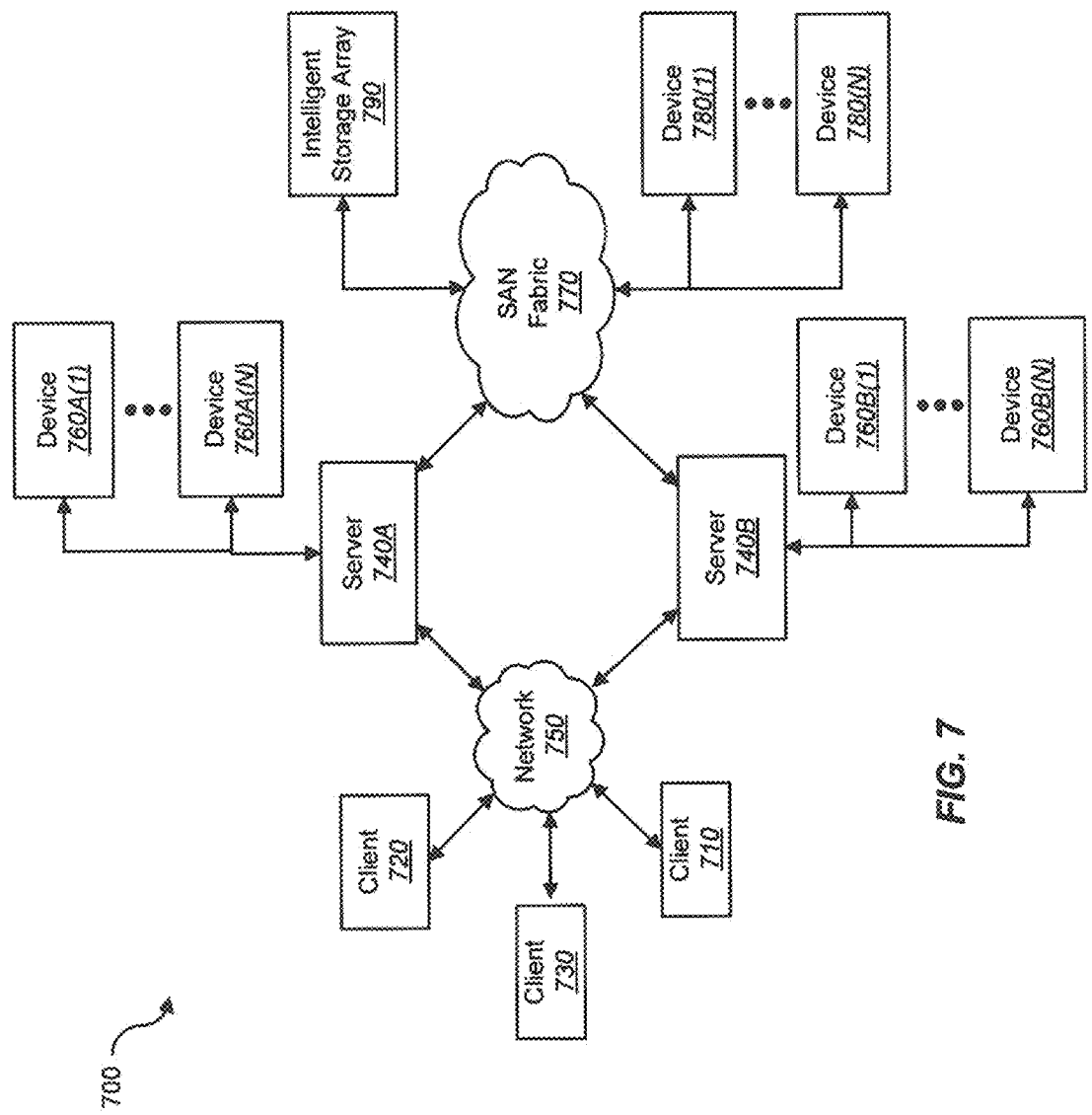
FIG. 7 is a block diagram depicting a network architecture in which client systems, as well as storage servers are coupled to a network.

FIG. 7 is a block diagram depicting a network architecture 700 in which client systems 710, 720 and 730, as well as storage servers 740A and 740B (any of which can be implemented using computer system 710), are coupled to a network 750. The storage server 740A is further depicted as having storage devices 760A(1)-(N) directly attached, and storage server 740B is depicted with storage devices 760B(1)-(N) directly attached. Storage servers 840A and 840B are also connected to a SAN fabric 770, although connection to a storage area network is not required for operation of the disclosure. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present disclosure is not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for creating a rights management system (RMS) with superior layers and subordinate layers, comprising:
    establishing a separate trust network for each of a plurality of layers of the RMS, wherein each trust network comprises one or more computing nodes within each of the plurality of layers, wherein a first layer comprises an enterprise rights management (ERM) layer to manage access rights associated with a ciphertext data object, and wherein a second layer comprises an object storage rights management (OSRM) layer to manage storage attributes of the ciphertext data object;
    obtaining a document on a computing node that is a member of a first trust network in the first layer of the plurality of layers;
    encrypting the document to the ciphertext data object;
    creating a publishing license for each of the plurality of layers of the RMS, wherein each publishing license lists rights and attributes associated with the ciphertext data object for a respective layer, each layer including an authentication mechanism to validate users of a respective layer and to manage the data access rights for each user;
    encrypting each publishing license according to an encryption scheme, the encryption scheme based at least in part on the respective layer;
    sending, from the first trust network in the first layer, the ciphertext data object to a second trust network in the second layer, wherein the second layer is subordinate to the first layer; and
    decrypting the publishing license for the second layer to access the rights and attributes assigned to the second layer, wherein the publishing license for the OSRM layer specifies at least one of a minimum number of separate storage sites where the ciphertext data object is stored within the OSRM layer, a maximum number of copies of the ciphertext data object allowed in the OSRM layer, and a duration of time after which the ciphertext data object may be deleted.

2. The method of claim 1, further comprising establishing a contract between the first layer and the second layer.

3. The method of claim 2, wherein the contract prevents a computing node within the second layer from modifying the publishing license in the second layer prior to approval from a computing node within the first layer.

4. The method of claim 2, wherein the contract allows a computing node within the second layer to modify the publishing license in the second layer prior to receiving approval from a computing node within the first layer.

5. The method of claim 4, wherein the computing node in the second layer notifies the computing node in the first layer subsequent to the modification of the publishing license in the second layer.

6. The method of claim 2, wherein the contract allows a computing node within the second layer to modify the publishing license in the second layer without prior or subsequent notification to a computing node in the first layer.

7. The method of claim 2, wherein the contract allows a computing node within the second layer to delegate the enforcement of the publishing license in the second layer that is associated with the ciphertext data object to a computing node within a third layer, wherein the third layer is subordinate to the second layer.

8. A computer system within a superior layer of a rights management system (RMS) configured to manage rights and attributes associated with a data object, comprising:
 a processor;
 memory in electronic communication with the processor; and
 instructions stored in the memory, the instructions being executable by the processor to:
  establish a separate trust network for a first layer of the RMS, wherein each trust network comprises one or more computing nodes within the first layer, wherein the first layer comprises an enterprise rights management (ERM) layer to manage access rights associated with a ciphertext data object, and wherein a second layer comprises an object storage rights management (OSRM) layer to manage storage attributes of the ciphertext data object;
  encrypt a document to the ciphertext data object;
  create a publishing license for the first layer and the second layer of the RMS, wherein the first layer is the superior layer of the RMS, and wherein each publishing license lists rights and attributes associated with the ciphertext data object for a respective layer, each layer including an authentication mechanism to validate users of a respective layer and to manage the data access rights for each user;
  encrypt each publishing license according to an encryption scheme, the encryption scheme based at least in part on the respective layer;
  send, from a first trust network in the first layer, the ciphertext data object to a second trust network in the second layer, wherein the second layer is subordinate to the first layer; and
  decrypt the publishing license for the second layer to access the rights and attributes assigned to the second layer, wherein the publishing license for the OSRM layer specifies at least one of a minimum number of separate storage sites where the ciphertext data object is stored within the OSRM layer, a maximum number of copies of the ciphertext data object allowed in the OSRM layer, and a duration of time after which the ciphertext data object may be deleted.

9. The computer system of claim 8, wherein the instructions are executable by the processor to establish a contract between a computing node within the second layer.

10. The computer system of claim 9, wherein the contract prevents a computing node within the second layer from modifying the publishing license in the second layer prior to approval from the computer system within the first layer.

11. The computer system of claim 9, wherein the contract allows a computing node within the second layer to modify the publishing license in the second layer prior to receiving approval from the computer system within the first layer.

12. The computer system of claim 11, wherein the computing node in the second layer notifies the computer system in the first layer subsequent to the modification of the publishing license in the second layer.

13. The computer system of claim 9, wherein the contract allows a computing node within the second layer to modify the publishing license in the second layer without prior or subsequent notification to the computer system in the first layer.

14. The computer system of claim 9, wherein the contract allows a computing node within the second layer to delegate the enforcement of a publishing license in the second layer that is associated with the ciphertext data object to a computing node within a third layer, wherein the third layer is subordinate to the second layer.

15. A computer-program product for creating a rights management system (RMS) with superior layers and subordinate layers, the computer-program product comprising a non-transitory computer-readable medium having instructions thereon, the instructions comprising:
 code programmed to establish a separate trust network for each of a plurality of layers of the RMS, wherein each trust network comprises one or more computing nodes within each of the plurality of layers, wherein a first layer comprises an enterprise rights management (ERM) layer to manage access rights associated with a ciphertext data object, and wherein a second layer comprises an object storage rights management (OSRM) layer to manage storage attributes of the ciphertext data object;
 code programmed to obtain a document on a computing node that is a member of a first trust network in the first layer of the plurality of layers;
 code programmed to encrypt the document to the ciphertext data object;
 code programmed to create a publishing license for each of the plurality of layers of the RMS, wherein each publishing license lists rights and attributes associated with the ciphertext data object for a respective layer, each layer including an authentication mechanism to validate users of a respective layer and to manage the data access rights for each user;
 code programmed to encrypt each publishing license according to an encryption scheme, the encryption scheme based at least in part on the respective layer;
 code programmed to send, from the first trust network in the first layer, the ciphertext data object to a second trust network in the second layer, wherein the second layer is subordinate to the first layer; and
 code programmed to decrypt the publishing license for the second layer to access the rights and attributes assigned to the second layer, wherein the publishing license for the OSRM layer specifies at least one of a minimum number of separate storage sites where the ciphertext data object is stored within the OSRM layer, a maximum number of copies of the ciphertext data object allowed in the OSRM layer, and a duration of time after which the ciphertext data object may be deleted.

16. The method of claim 1, wherein an authentication mechanism of the second layer grants a first user read and write data access rights to protected data in the second trust network of the second layer without using an authentication mechanism of the first layer and grants a second user read-only data access rights to the protected data in the second trust network of the second layer without using an authentication mechanism of the first layer.

* * * * *